US012612478B2

(12) United States Patent
Yamauchi et al.

(10) Patent No.: US 12,612,478 B2
(45) Date of Patent: Apr. 28, 2026

(54) POLYVINYL ALCOHOL-BASED RESIN, METHOD FOR PRODUCING POLYVINYL ALCOHOL-BASED RESIN, DISPERSANT AND DISPERSANT FOR SUSPENSION POLYMERIZATION

(71) Applicant: MITSUBISHI CHEMICAL CORPORATION, Tokyo (JP)

(72) Inventors: Yoshihito Yamauchi, Tokyo (JP); Takenori Shige, Tokyo (JP); Tadashi Murakami, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 1224 days.

(21) Appl. No.: 17/487,625

(22) Filed: Sep. 28, 2021

(65) Prior Publication Data

US 2022/0010043 A1 Jan. 13, 2022

Related U.S. Application Data

(63) Continuation of application No. PCT/JP2020/013710, filed on Mar. 26, 2020.

(30) Foreign Application Priority Data

Mar. 29, 2019 (JP) ................................ 2019-068411

(51) Int. Cl.
*C08F 116/06* (2006.01)
*C08F 2/20* (2006.01)
(52) U.S. Cl.
CPC .............. *C08F 116/06* (2013.01); *C08F 2/20* (2013.01)

(58) Field of Classification Search
CPC ................................. C08F 8/12; C08F 118/08
See application file for complete search history.

(56) References Cited

U.S. PATENT DOCUMENTS

2005/0053792 A1* 3/2005 Toyoshima ............... C08F 8/28
525/330.3
2012/0329950 A1 12/2012 Kozuka
(Continued)

FOREIGN PATENT DOCUMENTS

CN 102127177 A 7/2011
CN 102812054 A 12/2012
(Continued)

OTHER PUBLICATIONS

Extended European Search Report issued in EP Patent Application No. 20783987.9, Apr. 21, 2022.
(Continued)

*Primary Examiner* — Michael M Dollinger
(74) *Attorney, Agent, or Firm* — GREENBLUM & BERNSTEIN, P.L.C.

(57) ABSTRACT

An object of the present invention is to provide a PVA-based resin having a degree of saponification obtained in the middle stage of the reaction, that is, an average degree of saponification of 68 mol % to 85 mol %, a narrow degree of saponification distribution, and excellent dispersion stability. The present invention relates to a polyvinyl alcohol-based resin having an average degree of saponification of 68 mol % to 85 mol %, and a ¼ value width of 7.0 minutes or less in a degree of saponification distribution obtained by high performance liquid chromatogram measured under specific conditions.

3 Claims, 2 Drawing Sheets

(56) References Cited

U.S. PATENT DOCUMENTS

| | | | | | |
|---|---|---|---|---|---|
| 2016/0304632 | A1 * | 10/2016 | Köhler | ...................... | C08F 8/12 |
| 2017/0335030 | A1 * | 11/2017 | Fukuhara | .............. | C08F 116/06 |
| 2019/0300627 | A1 * | 10/2019 | Nishimura | ............ | C08F 114/06 |

FOREIGN PATENT DOCUMENTS

| | | | | | |
|---|---|---|---|---|---|
| CN | 107151283 | A | 9/2017 | | |
| CN | 107474163 | A | 12/2017 | | |
| DE | 10242416 | A1 * | 3/2004 | ............... | C08F 8/12 |
| JP | S46-021892 | B1 | 6/1971 | | |
| JP | S53-110695 | A | 9/1978 | | |
| JP | H06-093017 | A | 4/1994 | | |
| JP | 2006-028233 | A | 2/2006 | | |
| JP | 2006-241448 | A | 9/2006 | | |
| JP | 2016-020436 | A | 2/2016 | | |
| JP | 2017-105997 | A | 6/2017 | | |
| JP | 2017-198638 | A | 11/2017 | | |
| WO | 2016/009631 | A1 | 1/2016 | | |

OTHER PUBLICATIONS

Office Action that issued in the corresponding Chinese Patent Application No. 202080024529.0 dated Jan. 20, 2024 and its English translation.

Office Action issued in the corresponding Japanese Patent Application No. 2021-511933 dated Jan. 9, 2024, and its English translation.

Office Action issued in Chinese Patent Application No. 202080024529.0 dated Jun. 29, 2023, along with English translation thereof.

ISR issued in WIPO Patent Application No. PCT/JP2020/013710, Jun. 16, 2020, English translation.

Written Opinion of the ISA issued in WIPO Patent Application No. PCT/JP2020/013710, Jun. 16, 2020.

Office Action issued in the corresponding Japanese Patent Application No. 2021-511933, dated Jun. 6, 2023, along with English translation.

Office Action that issued in the corresponding Chinese Patent Application No. 202080024529.0, dated Jul. 8, 2024, along with English translation thereof.

Office Action that issued in corresponding EP Patent Application No. 20783987.9 on Apr. 13, 2023.

* cited by examiner

POLYVINYL ALCOHOL-BASED RESIN, METHOD FOR PRODUCING POLYVINYL ALCOHOL-BASED RESIN, DISPERSANT AND DISPERSANT FOR SUSPENSION POLYMERIZATION

CLAIM FOR PRIORITY

This application is a Continuation of PCT/JP2020/013710 filed Mar. 26, 2020, and claims the priority benefit of Japanese application 2019-068411 filed Mar. 29, 2019, the contents of which are expressly incorporated by reference herein in their entireties.

TECHNICAL FIELD

The present invention relates to a polyvinyl alcohol-based resin and a production method therefor, more specifically to a polyvinyl alcohol-based resin having a narrow degree of saponification distribution and excellent dispersion stability and a production method therefor.

BACKGROUND ART

In the related art, polyvinyl alcohol-based resins (hereinafter, sometimes referred to as "PVA-based resin") are used as various dispersants, and are also used as dispersants (for example, a dispersant for emulsion polymerization, and a dispersant for suspension polymerization) during polymerization of monomers.

In addition, as a method of industrially producing a vinyl chloride resin, a method of suspension-polymerizing a vinyl chloride monomer or a mixture of a vinyl chloride monomer and a monomer copolymerizable with the vinyl chloride monomer is known. During the polymerization, a dispersant (hereinafter, also referred to as "dispersion stabilizer") such as a PVA-based resin, methyl cellulose, a vinyl acetate-maleic anhydride copolymer, and gelatin is used. Among these, various PVA-based dispersion stabilizers have been studied in accordance with the improvement of physical properties such as bulk density, particle size distribution, porosity, plasticizer absorbability, and residual monomer of the obtained vinyl chloride-based polymer (resin) particles. From the viewpoint of improving the surface activity of the PVA-based dispersion stabilizer, a PVA-based resin dispersion stabilizer has been proposed among the PVA-based dispersion stabilizers, focusing on the carbonyl group in the PVA molecule and the vinylene group adjacent thereto.

The PVA-based resin undergoes a dehydration or deacetic acid reaction by a heat treatment, thereby generating a vinylene group in the main chain. The PVA-based resin having such a structure is used for dispersion stabilizers for suspension, water retention materials, and the like during the production of polyvinyl chloride. It is also known that the strength is improved by subjecting a film-like or fibrous PVA-based resin to a heat treatment.

Thus, various studies on the PVA-based resins for use as dispersants have been conducted. For example, PTL 1 discloses a dispersion aid for suspension polymerization containing a polyvinyl alcohol-based polymer (A) containing an acetal group (a) having an olefin-based unsaturated double bond, and has a degree of saponification of 45 mol % to 60 mol %, an average polymerization degree of 120 to 400, and a block character of 0.5 or more. In addition, PTL 2 discloses a polyvinyl alcohol which has a degree of saponification of 80 mol % to 99.5 mol %, a viscosity average polymerization degree of 200 to 5000, and a sym-metry coefficient measured by reverse phase partition gradient high performance liquid chromatography by using a water-acetone eluent based on JIS K 0124 (2011) satisfying a specific equation.

CITATION LIST

Patent Literature

PTL 1: JP-A-2017-105997
PTL 2: JP-A-2016-20436

SUMMARY OF INVENTION

Technical Problem

When using the PVA-based resin as a dispersant, it is conceivable to narrow the degree of saponification distribution of the PVA-based resin in order to obtain good dispersion stability. In the saponification reaction, saponification progresses little by little in the early stage of the reaction, saponification progresses at once (quickly) in the middle stage of the reaction, and saponification progresses slowly in the late stage of the reaction. Therefore, when producing a PVA-based resin having a degree of saponification obtained in the early stage of the reaction or the late stage of the reaction, such as the PVA-based resin in PTL 1 or 2, a PVA-based resin having a narrow degree of saponification distribution can be obtained relatively easily.

In contrast, when an attempt is made to produce a PVA-based resin having a saponification rate obtained in the middle stage of the reaction, it was difficult to obtain a PVA-based resin having a narrow degree of saponification distribution due to a high saponification rate in the middle stage of the reaction.

Therefore, an object of the present invention is to provide a PVA-based resin having a degree of saponification obtained in the middle stage of the reaction, that is, a PVA-based resin having an average degree of saponification of 68 mol % to 85 mol %, a narrow degree of saponification distribution, and excellent dispersion stability.

Solution to Problem

As a result of intensive studies on the above matters, the present inventors have found that when the saponification rate is controlled in the saponification step, a PVA-based resin having a narrow degree of saponification distribution is obtained. Thus, the present invention has been completed.

Namely, the gist of the present invention is as follows.

[1] A polyvinyl alcohol-based resin, wherein an average degree of saponification is 68 mol % to 85 mol %, and a ¼ value width of a degree of saponification distribution obtained by high performance liquid chromatogram measured under the following conditions is 7.0 minutes or less, (Conditions): apparatus: liquid chromatography (LC-10AD, manufactured by Shimadzu Corporation), detector: corona charged aerosol detector (Corona plus, manufactured by ESA), column: particle diameter: 5 μm, 4.6 mm (inner diameter)×250 mm (length) (Nucleosil 100-5C18 B column, manufactured by GL Sciences Inc.), mobile phase flow rate: 0.5 mL/min, injection amount: 50 μL, eluent: (solvent A) ultrapure water, (solvent B) tetrahydrofuran, high-pressure gradient: solvent A/solvent B (volume ratio)=90/10 (0 minutes), 90/10 (5 minutes), 14/86 (43 minutes), and 14/86 (58 minutes) by a gradient elution method, measurement temperature: 50° C., sample: 10 vol % tetrahydrofuran aqueous solution (concentration: 2 mg/mL), and data acquisition interval: every second.

[2] A method for producing the polyvinyl alcohol-based resin according to [1], wherein
the ¼ value width of the degree of saponification distribution of the obtained polyvinyl alcohol-based resin is adjusted by a saponification step of controlling a saponification rate.

[3] The method for producing a polyvinyl alcohol-based resin according to [2], wherein the saponification step includes at least one step selected from the group consisting of a step of controlling a water content of a solvent in a vinyl ester-based polymer solution, a step of controlling a water content of a catalyst, a step of controlling a saponification time, a step of controlling a saponification temperature, and a step of controlling a catalyst concentration.

[4] A dispersant containing: the polyvinyl alcohol-based resin according to [1].

[5] A dispersant for suspension polymerization containing: the polyvinyl alcohol-based resin according to [1].

Advantageous Effects of Invention

According to the present invention, it is possible to obtain a PVA-based resin having a degree of saponification obtained in the middle stage of the saponification reaction in a region where the saponification rate is high in the related art, that is, a PVA-based resin having an average degree of saponification of 68 mol % to 85 mol %, a narrow degree of saponification distribution, and thus excellent dispersion stability.

DESCRIPTION OF EMBODIMENTS

Figure 1:
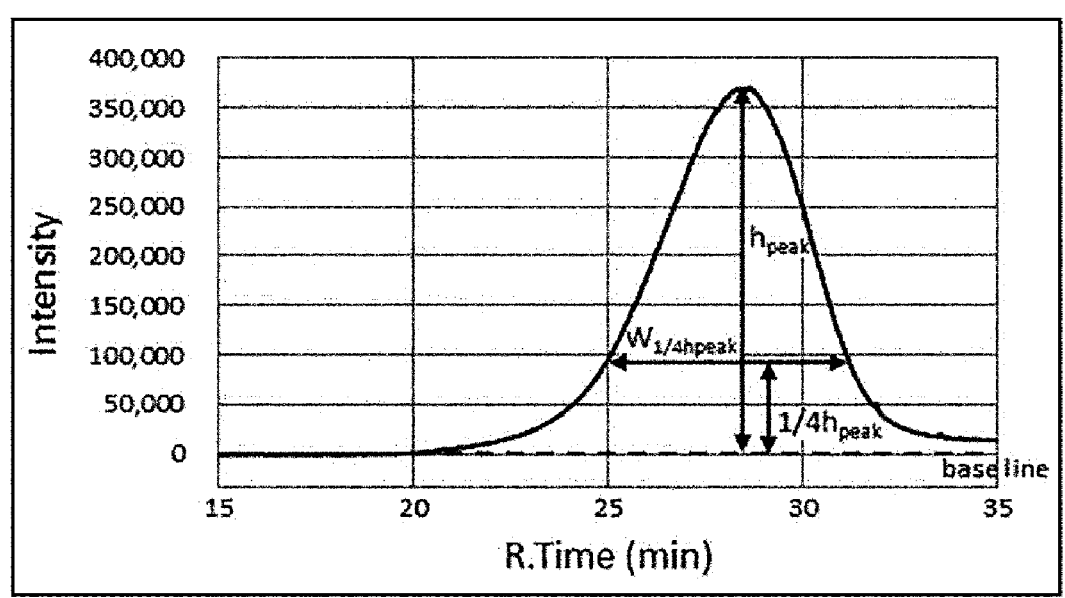
FIG. 1 is a high performance liquid chromatogram of a PVA-based resin according to Example 1.

Hereinafter, the present invention will be described in detail, but these show examples of desirable embodiments, and the present invention is not specified in these contents.
[Polyvinyl Alcohol-Based Resin]

The PVA-based resin according to an embodiment of the present invention has an average degree of saponification of 68 mol % to 85 mol %, and has a ¼ value width of 7.0 minutes or less in a degree of saponification distribution obtained by high performance liquid chromatogram measured under following conditions.

(Conditions): apparatus: liquid chromatography (LC-10AD, manufactured by Shimadzu Corporation), detector: corona charged aerosol detector (Corona plus, manufactured by ESA), column: particle diameter: 5 µm, 4.6 mm (inner diameter)×250 mm (length) (Nucleosil 100-5C18 B column, manufactured by GL Sciences Inc.), mobile phase flow rate: 0.5 mL/min, injection amount: 50 µL, eluent: (solvent A) ultrapure water, (solvent B) tetrahydrofuran, high-pressure gradient: solvent A/solvent B (volume ratio)=90/10 (0 minutes), 90/10 (5 minutes), 14/86 (43 minutes), and 14/86 (58 minutes) by a gradient elution method, measurement temperature: 50° C., sample: 10 vol % tetrahydrofuran aqueous solution (concentration: 2 mg/mL), and data acquisition interval: every second.

Generally, the PVA-based resin is a resin obtained by saponifying a vinyl ester homopolymer or a copolymer of a vinyl ester and another monomer using an alkali catalyst or the like.

The PVA-based resin according to the embodiment of the present invention has an average degree of saponification of 68 mol % to 85 mol %, more preferably 70 mol % or more and 83 mol % or less. When the average degree of saponification is within such a range, an acetic acid group (hydrophobic group) in addition to a hydroxyl group (hydrophilic) is present in the molecule of the PVA-based resin, so that the PVA-based resin has surface activity and is easily dispersed uniformly in a dispersion medium.

The average degree of saponification is measured in accordance with JIS K 6726:1994.

The average polymerization degree of the PVA-based resin is preferably 300 to 3000, more preferably 400 or more, and still more preferably 2800 or less. When the average polymerization degree is too low, the surface activity tends to be low, and when the PVA-based resin is used as a dispersant for suspension polymerization for vinyl chloride, aggregation is likely to occur during suspension polymerization. On the other hand, when the average polymerization degree is too high, the viscosity of a PVA-based resin solution increases, and the handleability decreases.

The average polymerization degree is measured in accordance with JIS K 6726:1994.

The PVA-based resin has a ¼ value width of 7.0 minutes or less, more preferably 6.8 minutes or less, and still more preferably 6.5 minutes or less in the degree of saponification distribution obtained by the high performance liquid chromatogram measured under the above conditions.

The method of obtaining the ¼ value width will be described with reference to FIG. 1, which is a high performance liquid chromatogram obtained under the above conditions. A line where the intensity is 0 is defined as a baseline, an intensity height of a peak top is defined as $h_{peak}$, and an intensity height which is ¼ of the above intensity height is defined as ¼ $h_{peak}$. Then, the peak width at the intensity height ¼ $h_{peak}$ is obtained as the ¼ value width ($W_{1/4\ hpeak}$, minutes).

By adopting the ¼ value width as the degree of saponification distribution, rather than the peak width (half width, ½ value width) at the intensity height which is ½ of $h_{peak}$, the correlation between the peak width and the dispersion stability effect becomes large.
[Method for Producing Polyvinyl Alcohol-Based Resin]

The method for producing a PVA-based resin according to an embodiment of the present invention is characterized in that the ¼ value width of the degree of saponification distribution of the obtained polyvinyl alcohol-based resin is adjusted by a saponification step of controlling a saponification rate.

For other steps, known methods can be used. For example, such a production method can include a step of polymerizing a monomer composition containing a vinyl ester-based monomer (monomer) to obtain a vinyl ester-based polymer, and in the saponification step of further saponifying the polymer, the saponification rate is controlled. Hereinafter, the production method will be described in order.

Examples of the vinyl ester-based monomer include vinyl formate, vinyl acetate, vinyl propionate, vinyl butyrate, vinyl caprate, vinyl laurate, vinyl palmitate, vinyl stearate, and other linear or branched saturated fatty acid vinyl esters. From the viewpoint of practice, as the vinyl ester-based monomer, vinyl acetate is preferably used, and vinyl acetate alone or a combination of vinyl acetate and a fatty acid vinyl ester compound other than vinyl acetate is more preferably used.

In polymerizing a vinyl ester-based monomer, particularly a monomer composition containing vinyl acetate, there is no particular limitation, and a known polymerization method can be optionally used. For example, solution polymerization can be carried out using an alcohol as a solvent, such as methanol, ethanol or isopropyl alcohol. In addition, bulk polymerization, emulsion polymerization, and suspension polymerization can also be used. In such solution polymerization, any means such as split charging and batch charging can be used as the method for charging the vinyl ester-based monomer.

The polymerization reaction is carried out using known radical polymerization catalysts such as azobisisobutyronitrile, acetyl peroxide, benzoyl peroxide, lauroyl peroxide, azobisdimethylvaleronitrile and azobismethoxyvaleronitrile. The reaction temperature is selected from the range of about 40° C. to the boiling point.

In addition, as a chain transfer agent for use in the polymerization of the monomer composition, for example, aldehydes and ketones are used. Examples of the aldehydes include acetaldehyde, propionaldehyde, butyraldehyde, and benzaldehyde. Examples of the ketones include acetone, methyl ethyl ketone, hexanone, and cyclohexanone. Among these, the chain transfer agent is preferably aldehydes, and particularly preferably acetaldehyde from the viewpoint of productivity such as solvent recovery.

The amount of the chain transfer agent added varies depending on the chain transfer constant of the chain transfer agent to be added, the average polymerization degree of the target PVA-based resin, and the like. For example, the amount of the chain transfer agent added may be 0.1 wt % to 5 wt %, and preferably 0.5 wt % or more and 3 wt % or less with respect to the vinyl ester-based monomer. In addition, the chain transfer agent may be charged in batch at the early stage or at the time of the polymerization reaction. By charging the chain transfer agent by any method, the molecular weight distribution of the PVA-based resin can be controlled.

The vinyl ester-based monomer may be used alone, but if necessary, copolymerization can be carried out using a monomer polymerizable with the vinyl ester-based monomer. That is, the monomer composition may contain the monomer polymerizable with the vinyl ester-based monomer.

Examples of such a monomer include: olefins such as ethylene, propylene, isobutylene, α-octene, α-dodecene, and α-octadecene; unsaturated acids such as acrylic acid, methacrylic acid, crotonic acid, maleic acid, maleic anhydride, itaconic acid, and salts or mono or dialkyl esters thereof; nitriles such as acrylonitrile and methacrylonitrile; amides such as acrylamide and methacrylamide; olefin sulfonic acids such as an ethylene sulfonic acid, an allyl sulfonic acid, a methallyl sulfonic acid or salts thereof; alkyl vinyl ethers; N-acrylamide methyltrimethylammonium chloride, allyltrimethylammonium chloride, dimethylallylvinyl ketone, N-vinylpyrrolidone, vinyl chloride, vinylidene chloride; polyoxyalkylene (meth)allyl ethers such as polyoxyethylene (meth)allyl ether and polyoxypropylene (meth)allyl ether; polyoxyalkylene (meth)acrylates such as polyoxyethylene (meth)acrylate and polyoxypropylene (meth)acrylate;

polyoxyalkylene (meth)acrylamides such as polyoxyethylene (meth)acrylamide and polyoxypropylene (meth)acrylamide; and hydroxy group-containing α-olefins such as polyoxyethylene (1-(meth)acrylamide-1,1-dimethylpropyl) ester, polyoxyethylene vinyl ether, polyoxypropylene vinyl ether, polyoxyethylene allylamine, polyoxypropylene allylamine, polyoxyethylene vinylamine, polyoxypropylene vinylamine, 3-butene-1-ol, 4-pentene-1-ol, 5-hexene-1-ol, and derivatives such as acylated products thereof. When the monomer composition contains these monomers, the content of the monomer component in the copolymerized vinyl ester-based polymer is preferably about 0.1 mol % to 10 mol %.

In addition, examples the monomer polymerizable with the vinyl ester-based monomer include diol-containing compounds such as 3,4-dihydroxy-1-butene, 3,4-diacyloxy-1-butene, 3-acyloxy-4-hydroxy-1-butene, 4-acyloxy-3-hydroxy-1-butene, 3,4-diacyloxy-2-methyl-1-butene, 4,5-dihydroxy-1-pentene, 4,5-diacyloxy-1-pentene, 4,5-dihydroxy-3-methyl-1-pentene, 4,5-diacyloxy-3-methyl-1-pentene, 5,6-dihydroxy-1-hexene, 5,6-diacyloxy-1-hexene, glycerin monoallyl ether, 2,3-diacetoxy-1-allyloxypropane, 2-acetoxy-1-allyloxy-3-hydroxypropane, 3-acetoxy-1-allyloxy-2-hydroxypropane, glycerin monovinyl ether, glycerin monoisopropenyl ether, vinyl ethylene carbonate, and 2,2-dimethyl-4-vinyl-1,3-dioxolane. When the monomer composition contains these monomers, the content of the monomer component in the copolymerized vinyl ester-based polymer is also preferably about 0.1 mol % to 10 mol %.

In the production method according to the embodiment of the present invention, the saponification rate is controlled in the saponification step of the vinyl ester-based polymer obtained above. Saponification is carried out in the presence of a catalyst by dissolving the vinyl ester-based polymer in a solvent.

The method of controlling the saponification rate is not particularly limited as long as the ¼ value width of the degree of saponification distribution of the obtained PVA-based resin can be adjusted. For example, the method of controlling the saponification rate preferably includes at least one step selected from the group consisting of:
  (1) a step of controlling a water content of a solvent in a vinyl ester-based polymer solution,
  (2) a step of controlling a water content of a catalyst,
  (3) a step of controlling a catalyst concentration,
  (4) a step of controlling a saponification time, and
  (5) a step of controlling a saponification temperature.
  Hereinafter, each step will be described in detail.
(1) Step of Controlling Water Content of Solvent in Vinyl Ester-Based Polymer Solution As a solvent for dissolving the vinyl ester-based polymer, an organic solvent or a mixed solvent of an organic solvent and water can be used generally. On the other hand, in this step, a mixed solvent of an organic solvent and water is used as such a solvent, and the water content of the mixed solvent is controlled. Accordingly, the saponification rate can be slowed down, and the ¼ value width of the degree of saponification distribution can be narrowed.

Examples of the organic solvent include alcohols such as methanol, ethanol and butanol, and ketones such as acetone. From the viewpoint of handleability, it is preferable to use an alcohol, and lower alcohols such as methanol, ethanol and butanol are particularly preferred.

When using a mixed solvent of an organic solvent and water, the ratio of the organic solvent to water (organic solvent:water) is preferably 99.99:0.01 to 90:10 (weight ratio), and more preferably 99.9:0.1 to 95:5.

In particular, it is preferable to use a mixed solvent of an alcohol and water. In this case, the ratio of the alcohol to water (alcohol:water) is preferably 99.9:0.1 to 90:10 (weight ratio), and more preferably 99.9:0.1 to 95:5.

The concentration of the vinyl ester-based polymer in the solvent is preferably 20 wt % to 65 wt %.

(2) Step of Controlling Water Content of Catalyst

As the catalyst at the time of saponification, an alkali catalyst or an acid catalyst can be used. As the alkali catalyst, for example, hydroxides of alkali metals such as sodium hydroxide, potassium hydroxide, sodium methylate, sodium ethylate, and potassium methylate, and alcoholate can be used. As the acid catalyst, for example, an aqueous solution of an inorganic acid such as hydrochloric acid or sulfuric acid, or an organic acid such as p-toluenesulfonic acid can be used. It is also possible to control the saponification rate using two or more types of catalysts.

Using these catalysts, the saponification rate can be adjusted by the step of controlling the water content of the catalyst. When the water content of the catalyst is increased, the saponification rate can be slowed down, and the ¼ value width of the degree of saponification distribution can be narrowed.

The water content of the catalyst can be adjusted by adding water to the catalyst solution.

The water content of the catalyst is preferably 5% or more, more preferably 10% or more, and still more preferably 13% or more in terms of weight fraction. On the other hand, the water content of the catalyst is preferably 30% or less, and more preferably 20% or less from the viewpoint of increasing the amount of the catalyst used. The water content of the catalyst can be determined by the Karl Fischer method.

(3) Step of Controlling Catalyst Concentration

Further, the saponification rate can be adjusted by the step of controlling the catalyst concentration. The amount of the catalyst used is generally about 1 to 30 mmol equivalent with respect to the vinyl ester-based polymer. On the other hand, when the saponification rate is controlled by controlling the catalyst concentration, the saponification rate can be slowed down by adjusting the catalyst concentration so as to be the optimum amount for the vinyl ester-based polymer.

(4) Step of Controlling Saponification Time, and (5) Step of Controlling Saponification Temperature The saponification rate can also be adjusted by a step of controlling the saponification time and/or the saponification temperature. In general, the saponification time and the saponification temperature are not particularly limited, and are generally about 5 minutes to 1 hour and about 20° C. to 60° C.

On the other hand, when the saponification rate is controlled by controlling the saponification time or the saponification temperature, the saponification rate can be slowed down by lengthening the saponification time and/or lowering the saponification temperature. However, in consideration of productivity, it is preferable to control the degree of saponification distribution by shortening the saponification time and raising the temperature. Specifically, the suitable saponification time and saponification temperature vary depending on the type of the vinyl ester-based polymer or the catalyst, the water content of the catalyst, etc. Although not unconditionally specified, the suitable saponification time and saponification temperature are generally 10 to 30 minutes and/or 30° C. to 55° C.

The PVA-based resin obtained by saponification as described above is then dried to become a powdery PVA-based resin. Examples of the drying method include vacuum drying, normal pressure drying, and hot air drying. The drying time is, for example, 10 minutes to 20 hours, and preferably 1 hour to 15 hours. The drying temperature is, for example, 40° C. to 120° C., preferably 40° C. to 100° C., and more preferably 50° C. or higher and lower than 80° C.

[Dispersant]

When the PVA-based resin according to the embodiment of the present invention is used as a dispersant, examples of the objects to be dispersed include polymerizable monomers and powders. In particular, the PVA-based resin according to the embodiment of the present invention preferably disperses a polymerizable monomer and is used as a dispersant for suspension polymerization.

Examples of the polymerizable monomer as a target of suspension polymerization include vinyl chloride, vinylidene halide, vinyl ether, vinyl acetate, vinyl benzoate, acrylic acid, methacrylic acid, maleic acid or an anhydride thereof, ethylene, propylene, and styrene. Among these, the dispersant containing the PVA-based resin according to the embodiment of the present invention is suitably used for homopolymerization of vinyl chloride or copolymerization of vinyl chloride with a copolymerizable monomer.

[Dispersant for Suspension Polymerization]

Specific examples of a case where the PVA-based resin according to the embodiment of the present invention is used as a dispersant for suspension polymerization are shown below, but the present invention is not limited thereto.

The amount of the PVA-based resin used may be appropriately adjusted according to the monomer to be subjected to suspension polymerization. For example, when used for suspension polymerization of a vinyl chloride-based monomer, the amount of the PVA-based resin used is preferably used in an amount of 5 parts by weight or less, more preferably 1 part by weight or less, and still more preferably 0.2 parts by weight, with respect to 100 parts by weight of the vinyl chloride-based monomer. The amount of the PVA-based resin used within the above range is preferred because the amount of the PVA-based resin that does not act as a dispersant is reduced. In addition, the amount of the PVA-based resin used is preferably 0.01 parts by weight or more, and more preferably 0.02 parts by weight or more.

During suspension polymerization, for example, the polymerization is carried out in the presence of an oil-soluble catalyst, by adding the PVA-based resin to water or a heated water medium as a dispersant, and dispensing the vinyl chloride-based monomer.

As a method of adding the PVA-based resin, the PVA-based resin may be added as powders, or may be added in a dispersed or dissolved state in water, an organic solvent, or a mixed solvent of water and an organic solvent. Examples of the organic solvent include alcohols, ketones, and esters.

The dispersant may be added all in batch at the early stage of polymerization, or may be added all in batch or separately in the middle of polymerization.

In addition, as an additive during the polymerization, other stabilizers, polymerization aids, polymerization catalysts and the like can be used.

As other stabilizers, known stabilizers can be used in combination, and for example, a polymer substance can be used in combination. Examples of the polymer substance include PVA-based resins other than the PVA-based resin according to the present embodiment. For example, an unmodified PVA-based resin, a modified PVA-based resin, or the like can be used.

Examples of the polymerization aid include various surfactants and inorganic dispersants. It is also possible to use the PVA-based resin according to the present embodiment as a polymerization aid.

The polymerization catalyst may be any oil-soluble catalyst. For example, benzoyl peroxide, lauroyl peroxide, diisopropyl peroxydicarbonate, $\alpha,\alpha'$-azobisisobutyronitrile, $\alpha,\alpha'$-azobis-2,4-dimethyl-valeronitrile, acetylcyclohexylsulfonyl peroxide or a mixture thereof can be used.

EXAMPLES

Hereinafter, the present invention is demonstrated furthermore concretely by ways of Examples, but the present invention is not limited to following Examples, unless the gist of the present invention is exceeded. In the examples, "part" and "%" is on a weight basis.

Example 1

Into a polymerization can, 100 parts of vinyl acetate, 20 parts of methanol and 0.005% of azobisisobutyronitrile with respect to vinyl acetate were charged, and replacement with nitrogen was performed. Thereafter, the polymerization was started by heating at a boiling point, and the polymerization was stopped when the polymerization rate reached 60% after a reaction time of about 5 hours. Then, the unpolymerized vinyl acetate was removed.

The obtained vinyl ester-based polymer was adjusted such that the resin content (concentration of the vinyl ester-based polymer in the solvent) was 42%, and saponification was carried out at 45° C. for 15 minutes. A methanol solution of sodium hydroxide having a water content of 15% was used as the catalyst at the time of saponification, and the amount of the catalyst used was 8 mmol equivalent with respect to the vinyl ester-based polymer. After saponification, a drying step was performed at 95° C. for 6 hours, thereby obtaining a PVA-based resin.

Comparative Example 1

The vinyl ester-based polymer obtained in the same manner as in Example 1 was adjusted such that the resin content was 42%, and saponification was carried out at 45° C. for 15 minutes. A methanol solution of sodium hydroxide having a water content of 9% was used as the catalyst at the time of saponification, and the amount of the catalyst used was 8 mmol equivalent with respect to the vinyl ester-based polymer. After saponification, a drying step was performed at 95° C. for 6 hours, thereby obtaining a PVA-based resin.

(Evaluation Methods)

In the production of the PVA-based resin, the water content of the catalyst at the time of saponification was measured by the Karl Fischer method. The results are shown in Table 1.

The average polymerization degree and the degree of saponification of the PVA-based resin were measured in accordance with JIS K 6726: 1994. The results are shown in Table 1.

The $\frac{1}{4}$ value width of the degree of saponification distribution of the PVA-based resin was obtained by using a line where the intensity was 0 as a baseline, an intensity height of a peak top as $h_{peak}$, and a peak width at an intensity height ($\frac{1}{4}$ $h_{peak}$) which was $\frac{1}{4}$ of the above intensity height as the $\frac{1}{4}$ value width ($W_{1/4\ hpeak}$, minutes) in the high performance liquid chromatogram measured under the following conditions.

(Conditions): apparatus: liquid chromatography (LC-10AD, manufactured by Shimadzu Corporation), detector: corona charged aerosol detector (Corona plus, manufactured by ESA), column: particle diameter: 5 μm, 4.6 mm (inner diameter)×250 mm (length) (Nucleosil 100-5C18 B column, manufactured by GL Sciences Inc.), mobile phase flow rate: 0.5 mL/min, injection amount: 50 μL, eluent: (solvent A) ultrapure water, (solvent B) tetrahydrofuran, high-pressure gradient: solvent A/solvent B (volume ratio)=90/10 (0 minutes), 90/10 (5 minutes), 14/86 (43 minutes), and 14/86 (58 minutes) by a gradient elution method, measurement temperature: 50° C., sample: 10 vol % tetrahydrofuran aqueous solution (concentration: 2 mg/mL), and data acquisition interval: every second.

Figure 2:
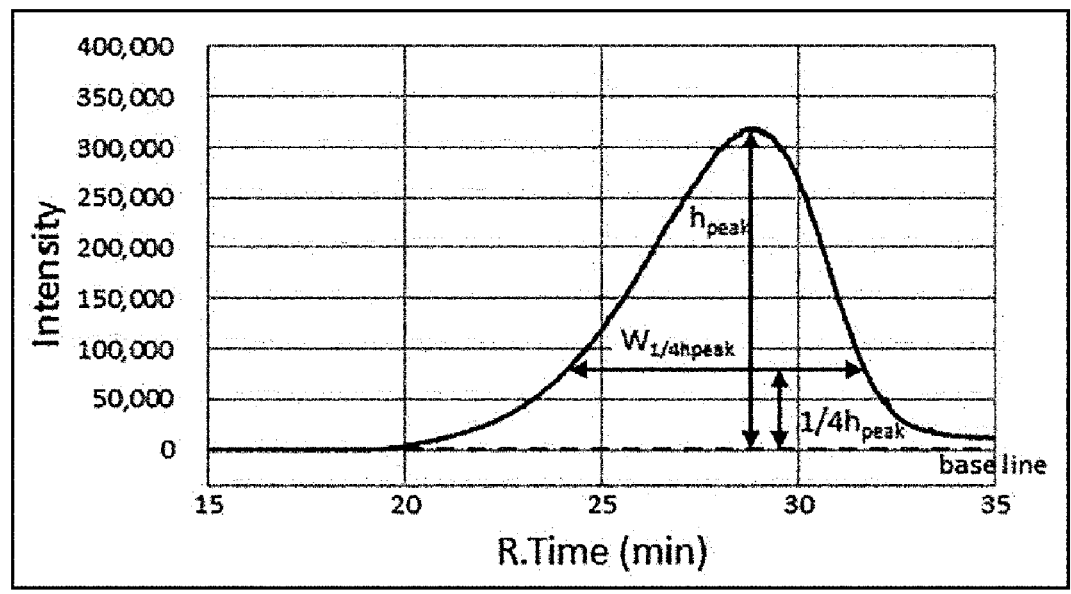
FIG. 2 is a high performance liquid chromatogram of a PVA-based resin according to Comparative Example 1.

The results are shown in Table 1, and the high performance liquid chromatogram of Example 1 is shown in FIG. 1, and the high performance liquid chromatogram of Comparative Example 1 is shown in FIG. 2.

Figure 3:
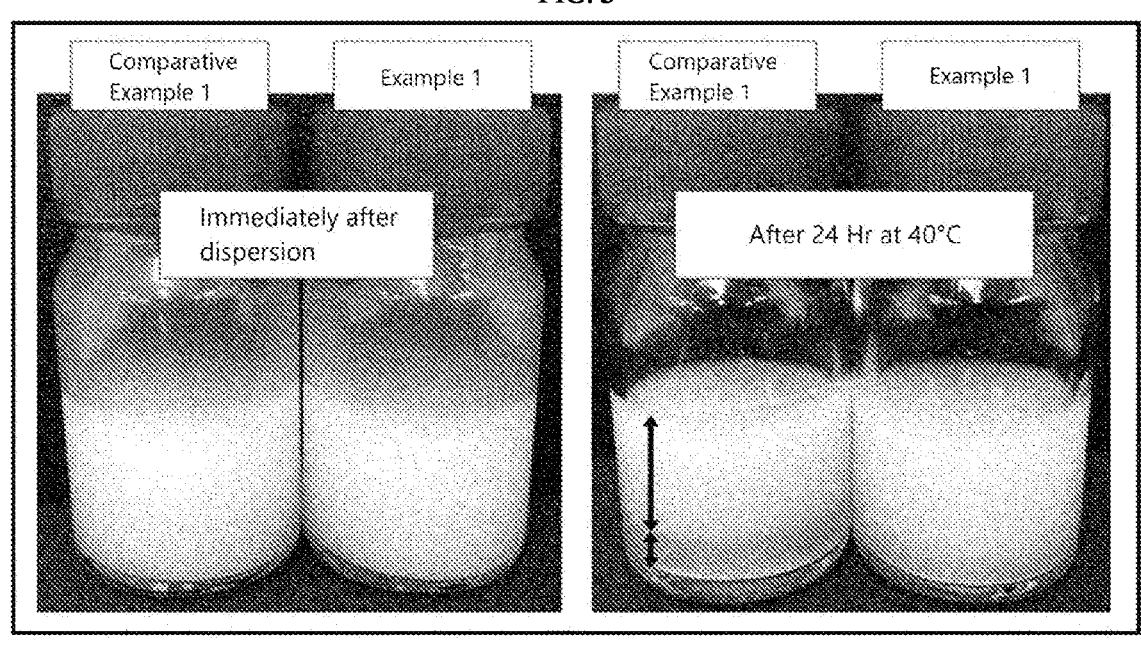
FIG. 3 is a diagram showing results of a dispersion stability test of the PVA-based resins according to Example 1 and Comparative Example 1.

As a dispersion stability test, 10 g of a 4% aqueous solution of the PVA-based resin and 2.5 g of vinyl acetate were charged into a sample bottle, and the mixture was stirred at 25° C. to disperse vinyl acetate. Thereafter, the sample bottle was allowed to stand in a constant temperature bath at 40° C. for 24 hours, and the dispersed state after 24 hours was visually observed and evaluated according to the following criteria. The results are shown in FIG. 3 and Table 1.

A (good): A uniform dispersed state was maintained and stable.

B (poor): A dispersed state was not maintained and the solution was separated into two layers

TABLE 1

| | Water content (%) of catalyst during saponification | Average polymerization degree | Average degree of saponification (mol %) | $\frac{1}{4}$ value width (min) of degree of saponification distribution | Dispersion stability |
|---|---|---|---|---|---|
| Example 1 | 15 | 2200 | 80 | 6.3 | A |
| Comparative Example 1 | 9 | 2200 | 80 | 7.6 | B (separation) |

In the dispersion stability test using the PVA-based resin of Example 1, which has a $\frac{1}{4}$ value width of 7.0 minutes or less in the degree of saponification distribution, it was seen that a dispersed state is maintained even after being allowed to stand for 24 hours and good dispersion stability is shown. On the other hand, in the dispersion stability test using the PVA-based resin of Comparative Example 1, as shown by an arrow in FIG. 3, the solution was separated into two layers after being allowed to stand for 24 hours. Thus, it is seen that although the PVA-based resin of Comparative Example 1 has the same average polymerization degree or average degree of saponification as that of the PVA-based resin of Example 1, the dispersion stability is low due to a wide $\frac{1}{4}$ value width of 7.6 minutes in the degree of saponification distribution.

Although the present invention has been described in detail with reference to specific embodiments, it will be apparent to those skilled in the art that various changes and modifications can be made without departing from the spirit and scope of the present invention. This application is based on a Japanese Patent Application (Japanese Patent Application No. 2019-068411) filed Mar. 29, 2019, the contents of which are incorporated herein by reference.

INDUSTRIAL APPLICABILITY

The PVA-based resin according to the present invention is very useful as a dispersant, particularly as a dispersant for suspension polymerization, because of being capable of obtaining extremely excellent dispersion stability as a dispersant.

The invention claimed is:

1. A polyvinyl alcohol-based resin, wherein a volume average degree of saponification is 68 mol % to 85 mol %, and a ¼ value width of a degree of saponification distribution obtained by high performance liquid chromatogram measured is 7.0 minutes or less under the following conditions:

apparatus: liquid chromatography, detector: corona charged aerosol detector, column: particle diameter: 5 μm, 4.6 mm inner diameter× 250 mm length, mobile phase flow rate: 0.5 mL/min, injection amount: 50 μL, eluent: solvent A ultrapure water, solvent B tetrahydrofuran, high-pressure gradient: solvent A/solvent B volume ratio=90/10 at 0 minutes, 90/10 at 5 minutes, 14/86 at 43 minutes, and 14/86 at 58 minutes by a gradient elution method, measurement temperature: 50° C., sample: 10 vol % tetrahydrofuran aqueous solution at concentration: 2 mg/mL, and data acquisition interval: every second.

2. A dispersant comprising: the polyvinyl alcohol-based resin according to claim 1.

3. A dispersant for suspension polymerization comprising: the polyvinyl alcohol-based resin according to claim 1.

* * * * *